(12) United States Patent
Peiker

(10) Patent No.: US 9,998,578 B2
(45) Date of Patent: Jun. 12, 2018

(54) MOBILE TELEPHONE INTEGRATION DEVICE

(71) Applicant: Peiker Acustic GmbH & Co. KG, Friedrichsdorf (DE)

(72) Inventor: Andreas Peiker, Friedrichsdorf (DE)

(73) Assignee: Peiker Acustic GmbH & Co. KG, Friedrichsdorf (DE)

( * ) Notice: Subject to any disclaimer, the term of this patent is extended or adjusted under 35 U.S.C. 154(b) by 43 days.

(21) Appl. No.: 14/322,163

(22) Filed: Jul. 2, 2014

(65) Prior Publication Data

US 2015/0024801 A1    Jan. 22, 2015

(30) Foreign Application Priority Data

Jul. 17, 2013    (DE) .......................... 10 2013 011 881

(51) Int. Cl.
| | |
|---|---|
| *H04M 1/60* | (2006.01) |
| *H02J 7/02* | (2016.01) |
| *H01Q 1/27* | (2006.01) |
| *H01Q 21/00* | (2006.01) |
| *H02J 50/90* | (2016.01) |
| *H02J 50/20* | (2016.01) |
| *H01Q 1/24* | (2006.01) |
| *H01Q 1/52* | (2006.01) |
| *H01Q 21/28* | (2006.01) |

(52) U.S. Cl.
CPC .......... *H04M 1/6075* (2013.01); *H01Q 1/243* (2013.01); *H01Q 1/27* (2013.01); *H01Q 1/52* (2013.01); *H01Q 21/00* (2013.01); *H01Q 21/28* (2013.01); *H02J 7/025* (2013.01); *H02J 50/20* (2016.02); *H02J 50/90* (2016.02); *H04M 1/6091* (2013.01)

(58) Field of Classification Search
CPC . H01Q 9/42; H01Q 1/27; H01Q 21/00; B60R 11/0241; H04M 1/60; H02J 7/02
USPC .............. 455/569, 557, 562.1, 575.1; 701/2; 439/700
See application file for complete search history.

(56) References Cited

U.S. PATENT DOCUMENTS

| | | | | |
|---|---|---|---|---|
| 2007/0178754 A1* | 8/2007 | Schlegel | ................ | H01Q 17/00 439/527 |
| 2009/0305746 A1* | 12/2009 | Pursche | .............. | B60R 11/0241 455/569.2 |
| 2011/0057607 A1* | 3/2011 | Carobolante | ........... | H02J 7/025 320/108 |
| 2011/0193748 A1* | 8/2011 | Kuo | ......................... | H01Q 9/42 343/700 MS |

(Continued)

FOREIGN PATENT DOCUMENTS

DE    10 2011 011 053 A1    8/2011

*Primary Examiner* — Kamran Afshar
*Assistant Examiner* — Nicole Louis-Fils
(74) *Attorney, Agent, or Firm* — Burr & Brown, PLLC

(57) ABSTRACT

The invention relates to a mobile telephone integration device for integrating a mobile telephone into a vehicle, the mobile telephone integration device including an adapter with a depositing plane on which the mobile telephone is deposited, at least two mobile radio coupling antennas and at least one charging antenna for wirelessly charging an energy store of the mobile telephone that is arranged below the depositing plane, where the at least one charging antenna is arranged between the at least two mobile radio coupling antennas.

6 Claims, 4 Drawing Sheets

(56) References Cited

U.S. PATENT DOCUMENTS

| | | | |
|---|---|---|---|
| 2012/0062441 A1* | 3/2012 | Peiker | B60R 11/0241 |
| | | | 343/912 |
| 2013/0252661 A1* | 9/2013 | Holz | G08C 17/02 |
| | | | 455/552.1 |
| 2013/0295992 A1* | 11/2013 | Lachnitt | H04M 1/04 |
| | | | 455/556.1 |
| 2014/0266030 A1* | 9/2014 | Park | H01F 27/34 |
| | | | 320/108 |
| 2014/0324252 A1* | 10/2014 | Kessler | B60R 25/245 |
| | | | 701/2 |

* cited by examiner

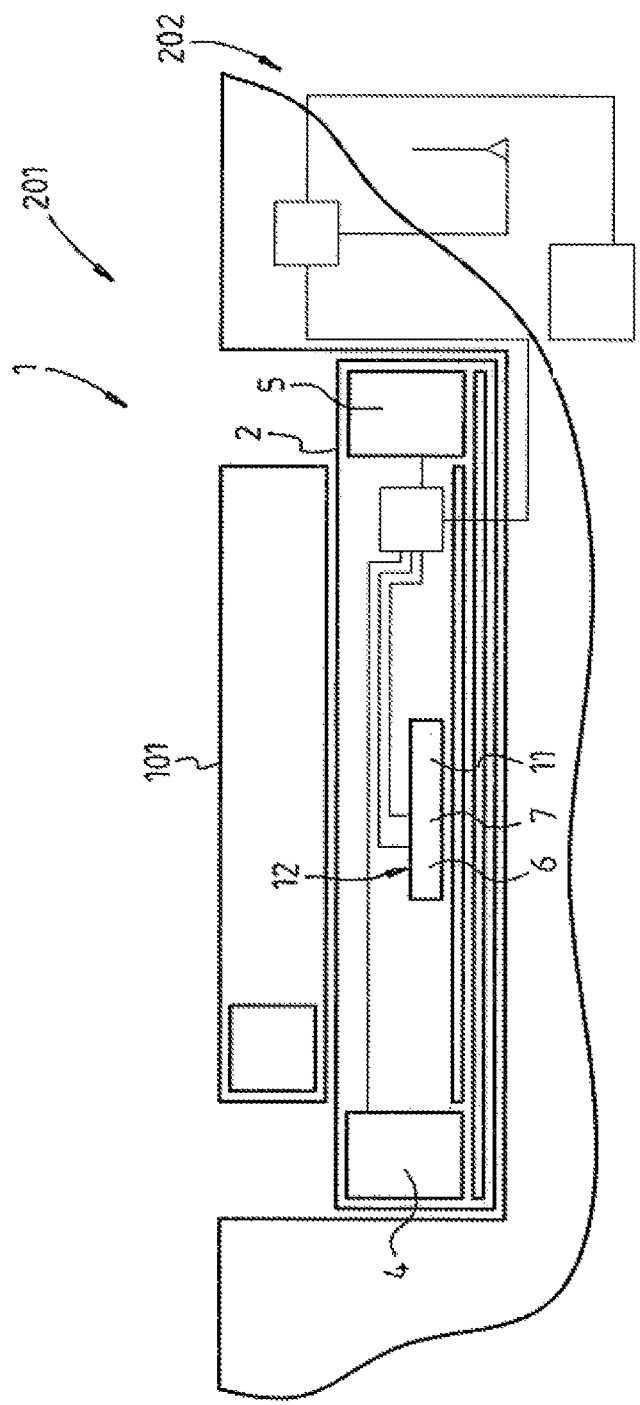

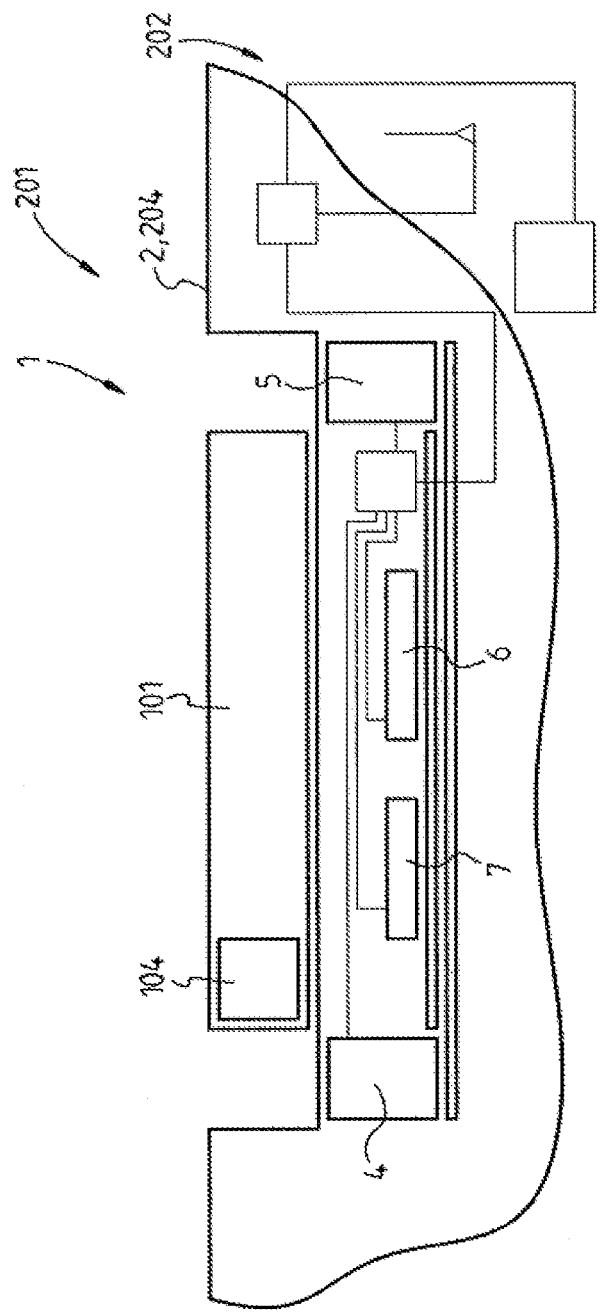

MOBILE TELEPHONE INTEGRATION DEVICE

This application claims the benefit under 35 USC § 119(a)-(d) of German Application No. 10 2013 011 881.6 filed Jul. 17, 2013.

BACKGROUND OF THE INVENTION

Field of the Invention

The present invention relates to a mobile telephone integration device.

Description Of Related Art

From DE 10 2011 011 053 A1, a mobile telephone integration device for integrating a mobile telephone into a vehicle is known, the mobile telephone integration device comprising an adapter with a depositing plane on which the mobile telephone can be deposited, two mobile radio coupling antennas and one charging antenna for wirelessly charging an energy store of the mobile telephone being arranged below the depositing plane.

SUMMARY OF THE INVENTION

It is the object of the invention to provide a mobile telephone integration device which, in particular, is suitable for mobile telephones with a mobile radio antenna arranged at the edge.

In the mobile telephone integration device according to the present invention, at least one charging antenna is arranged between the mobile radio coupling antennas. As a result, the mobile radio coupling antennas can be positioned at such a distance from one another that in the case of a mobile telephone with the mobile radio antenna arranged on an edge thereof that is deposited in the center on the depositing plane, at least one of the mobile radio coupling antennas is comparatively close to the mobile radio antenna of the mobile telephone.

It is also provided to arrange between the mobile radio coupling antennas additionally at least one communication antenna for wireless communication between vehicle electronics, which can be connected to the adapter, and the mobile telephone. By this means, the constructional space arranged between the mobile radio coupling antennas can be utilized to an optimum degree.

It is also provided to equip the adapter with a metalized layer, the antennas being arranged between the metalized layer and the depositing plane. This avoids unwanted disturbance of lines or devices arranged underneath the adapter.

It is also provided to equip the adapter with an absorber layer, the absorber layer being arranged between the metalized layer and the depositing plane, the communication antenna and the charging antenna being arranged between the absorber layer and the depositing plane, and the absorber layer, in particular, being arranged between the mobile radio coupling antennas. By this means, interference attenuation between the individual antennas is achieved due to which the individual antennas influence one another only a little in spite of the short distances from one another. Furthermore, this also prevents the reflecting of electromagnetic waves off of the metalized layer used as shielding.

It is also provided to design the charging antenna also as near-field antenna, namely as an antenna which operates in accordance with a near-field communication standard and, particularly, in accordance with the NFC standard. By this means, an additional antenna can be omitted so that more constructional space is available for the arrangement of the charging antenna.

Finally, it is provided to design the adapter as an integral part of the console of the vehicle. By this means, the number of components can be reduced.

BRIEF DESCRIPTION OF THE DRAWINGS

Further details of the invention are described in the drawing by means of diagrammatically represented exemplary embodiments.

FIG. 3 shows a diagrammatic representation of a second variant of an embodiment of a mobile telephone integration device; and FIG. 4 shows a diagrammatic representation of a third variant of an embodiment of a mobile telephone integration device.

DETAILED DESCRIPTION OF THE INVENTION

Figure 1:
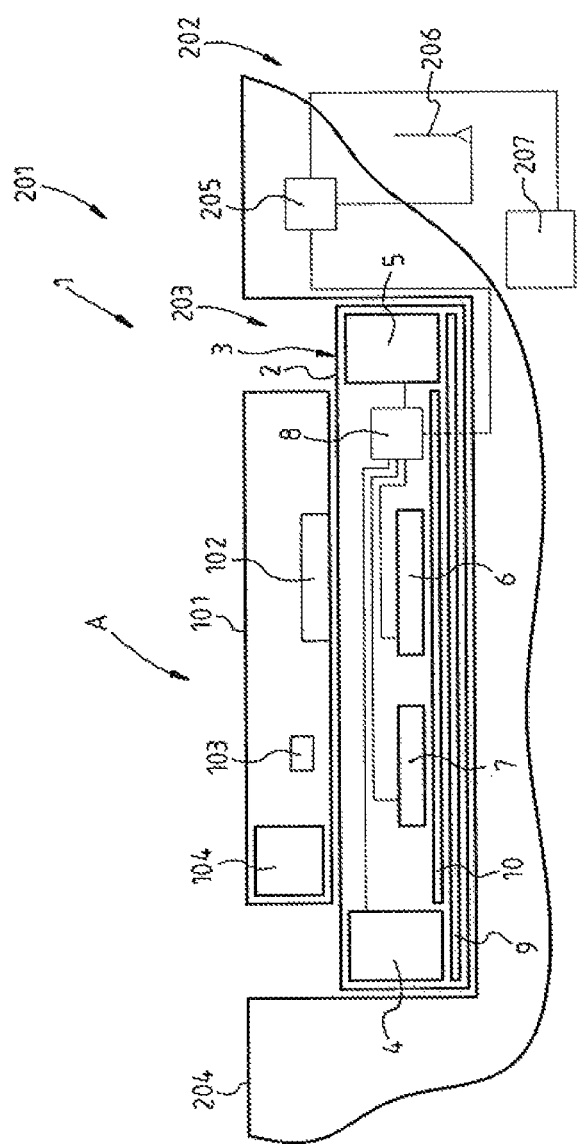
FIG. 1 shows a diagrammatic representation of a first variant of an embodiment of a mobile telephone integration device with a mobile telephone deposited in a position A.

FIG. 1 shows a diagrammatic representation of a first variant of an embodiment of a mobile telephone integration device 1 according to the present invention for integrating a mobile telephone 101 into a vehicle 201. In this context, the mobile telephone integration device 1 comprises an adapter 2 with a depositing plane 3. The mobile telephone 101 rests on the depositing plane 3. The mobile telephone integration device 1 comprises two mobile radio coupling antennas 4, 5 and one charging antenna 6 for wirelessly charging an energy store 102 of the mobile telephone 101. The antennas 4, 5 and 6 are arranged below the depositing plane 3. The charging antenna 6 is positioned between the mobile radio coupling antennas 4, 5. The mobile telephone integration device 1 furthermore comprises a communication antenna 7, which is arranged between the mobile radio coupling antennas 4, 5. The communication antenna 7 provides for wireless communication between vehicle electronics 202, which can be connected to the adapter 2, and the mobile telephone 101, which also includes a communication antenna 103. The adapter 2 is arranged in a receiving space 203 of a console 204 of the vehicle 201. The antennas 4, 5, 6 and 7 are connected to the vehicle electronics 202, the vehicle electronics 202 comprising an antenna amplifier 205, an outside antenna 206 and an interface 207 to devices, not shown, such as a display and an input device of the vehicle 201, for example. The adapter 2 also comprises electronics 8 to which the antennas 4, 5, 6 and 7 are connected. Opposite to the depositing plane 3, a metalized layer 9 is arranged with the antennas 4, 5, 6 and 7 positioned and arranged between the metalized layer 9 and the depositing plane 3. Furthermore, the adapter 2 comprises an absorber layer 10, the absorber layer 10 being arranged between the metalized layer 9 and the depositing plane 3. In this embodiment, the communication antenna 7 and the charging antenna 6 are arranged between the absorber layer 10 and the depositing plane 3, and the absorber layer 10 is here positioned between the mobile radio coupling antennas 4, 5. The mobile telephone 101 with its antenna 104, which is designed as mobile radio antenna, is aligned in such a manner that it is located in a position A, shown in FIG. 1, which is adjacent to the mobile radio coupling antenna 4, and as a result interference-free coupling of the mobile telephone 101 and the adapter 2 takes place.

Figure 2:
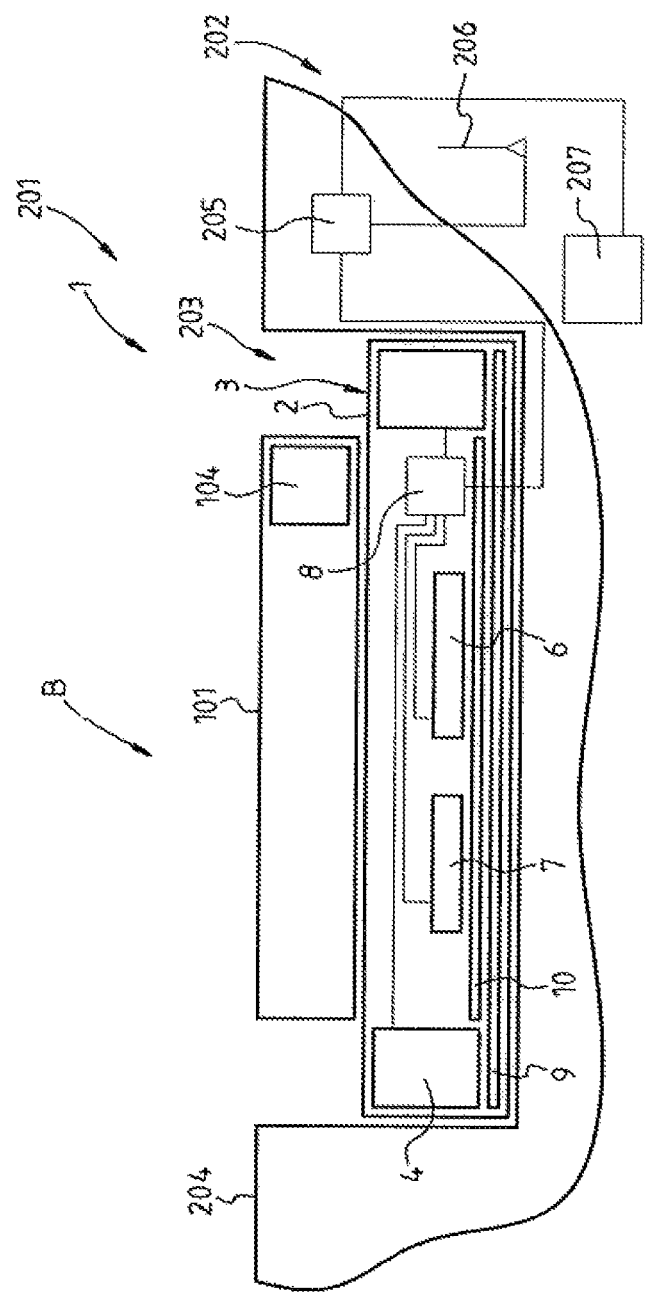
FIG. 2 shows the mobile telephone integration device known from FIG. 1, with a mobile telephone deposited in a position B.

FIG. 2 illustrates when the mobile telephone 101 is located in the mobile telephone integration device 1 from FIG. 1 in a position B, that the antenna 104 is positioned adjacent to the mobile radio coupling antenna 5. Due to the two mobile radio coupling antennas 4, 5, in the mobile telephone integration device 1, the quality of the adapter's operation is independent of whether the mobile telephone 101 is located in position A or in position B, and thus is optimally suited for integrating the mobile telephone 101. In this context, the depositing plane 3 is dimensioned in such a manner that elongated mobile telephones and the two mobile radio coupling antennas 4, 5 are arranged at the short transverse sides. Due to the flat type of construction of modern mobile telephones, the good integration of a mobile telephone 101 is guaranteed in both positions A and B and also independent of whether the mobile telephone 101 is deposited on the depositing plane 3 with its back side or with its display or touch screen facing the depositing plate 3.

FIG. 3 shows a second variant of an embodiment of a mobile telephone integration device 1 according to the present invention in a diagrammatic view. In principle, reference is made here to the description for FIGS. 1 and 2, and identical reference designations are also used for comparable components. In distinction from the first variant of the present invention shown in FIGS. 1 and 2, a charging antenna 6 is here designed additionally as a communication antenna 7 in the form of a near-field antenna 11, such that the charging antenna 6 and the near-field antenna 11 form one antenna body 12, which is arranged in the adapter 2 between mobile radio coupling antennas 4 and 5.

FIG. 4 shows a third variant of an embodiment of a mobile telephone integration device 1 according to the present invention in a diagrammatic view. In principle, reference is made here to the description for FIGS. 1 and 2, and identical reference designations are also used for comparable components. In distinction from the first variant of the present invention shown in FIGS. 1 and 2, the adapter 2 here forms at least part of the console 204 or, respectively, the console 204 is designed with the adapter 2 as an integral part thereof.

The present invention is not restricted to exemplary embodiments shown or described. Instead, it comprises developments of the present invention in the context of the property rights claims.

LIST OF REFERENCE DESIGNATIONS

1 Mobile telephone integration device
2 Adapter
3 Depositing plane
4, 5 Mobile radio coupling antenna
6 Charging antenna
7 Communication antenna
8 Electronics of 1
9 Metalized layer
10 Absorber layer
11 Near-field antenna
12 Antenna body
101 Mobile telephone
102 Energy store
103 Communication antenna
104 Antenna of 101
A Position of 101
B Position of 101
201 Vehicle
202 Vehicle electronics
203 Receiving space
204 Console
205 Antenna amplifier
206 Outside antenna
207 Interface The invention claim is:

1. A mobile telephone integration device for integrating a mobile telephone and a mobile radio antenna into a vehicle in respective first and second positions, the mobile telephone integration device comprising: an adapter with a depositing plane on which the mobile telephone is deposited, a first and a second mobile radio coupling antennas, at least one charging antenna for wirelessly charging an energy store of the mobile telephone, wherein the at least one charging antenna is arranged between the first and second mobile radio coupling antennas, a communication antenna arranged between the first and second mobile radio coupling antennas, and vehicle electronics adapted to be connected to the adapter, the mobile telephone, the first and second mobile radio coupling antennas, the at least one charging antenna, and the communication antenna, the vehicle electronics comprising at least one of an antenna amplifier, an outside antenna, and an interface, wherein the first and second mobile radio coupling antennas transmit at least one of voice and data signals to and from the mobile radio antenna of the mobile telephone and are arranged spaced from one another such that one of the first and second mobile radio coupling antennas is located adjacent to the mobile radio antenna of the mobile telephone, thereby providing interference free coupling both in the first position and in the second position, wherein the at least one charging antenna and the first and second mobile radio coupling antennas are arranged below the depositing plane, and wherein the adapter comprises additional electronics to which the at least one charging antenna, the first and second mobile radio coupling antennas, and the communication antenna are connected.

2. The mobile telephone integration device according to claim 1, further comprising at least one communication antenna for wireless communication between vehicle electronics, which are connected to the adapter, and the mobile telephone, wherein the at least one communication antenna is arranged between the at least two mobile radio coupling antennas.

3. The mobile telephone integration device according to claim 2, further comprising a metalized layer, and the at least two mobile radio coupling antennas, the at least one charging antenna and the at least one communications antenna are arranged between the metalized layer and the depositing plane.

4. The mobile telephone integration device according to claim 3, further comprising an absorber layer that is arranged between the metalized layer and the depositing plane, the at least one communication antenna and the at least one charging antenna are arranged between the absorber layer and the depositing plane, and the absorber layer is arranged between the at least two mobile radio coupling antennas.

5. The mobile telephone integration device according to claim 1, wherein the adapter is an integral part of a console of the vehicle.

6. The mobile telephone integration device according to claim 1, wherein the at least one charging antenna is designed to also operate as a near-field antenna.

\* \* \* \* \*